(12) United States Patent
Filoso et al.

(10) Patent No.: US 8,547,888 B2
(45) Date of Patent: Oct. 1, 2013

(54) MESH NETWORK NODE SERVICE IN A SLEEPING MESH NETWORK

(75) Inventors: John P. Filoso, Pleasant Grove, UT (US); Jay Douglas George, Orem, UT (US); John Robert Schwartz, Saratoga Springs, UT (US)

(73) Assignee: Digi International Inc., Minnetonka, MN (US)

( * ) Notice: Subject to any disclaimer, the term of this patent is extended or adjusted under 35 U.S.C. 154(b) by 767 days.

(21) Appl. No.: 12/696,727

(22) Filed: Jan. 29, 2010

(65) Prior Publication Data

US 2011/0188419 A1   Aug. 4, 2011

(51) Int. Cl.
G08C 17/00   (2006.01)

(52) U.S. Cl.
USPC ......................................................... 370/311

(58) Field of Classification Search
USPC ......................................................... 370/311
See application file for complete search history.

(56) References Cited

U.S. PATENT DOCUMENTS

| | | | |
|---|---|---|---|
| 5,924,017 A | 7/1999 | Pinter et al. | |
| 7,143,300 B2 * | 11/2006 | Potter et al. | 713/323 |
| 2005/0163088 A1 | 7/2005 | Yamano et al. | |
| 2006/0253735 A1 * | 11/2006 | Kwak et al. | 714/12 |
| 2008/0025279 A1 | 1/2008 | Young et al. | |
| 2010/0128645 A1 * | 5/2010 | Lin et al. | 370/311 |

FOREIGN PATENT DOCUMENTS

| | | |
|---|---|---|
| WO | WO-2010005209 A2 | 1/2010 |
| WO | WO-2010045530 A1 | 4/2010 |
| WO | WO-2011094503 A1 | 8/2011 |

OTHER PUBLICATIONS

"International Application No. PCT/US2011/022873, International Search Report and Written Opinion mailed Apr. 27, 2011", 19 pgs.

* cited by examiner

*Primary Examiner* — Derrick Ferris
*Assistant Examiner* — Majid Esmaeilian
(74) *Attorney, Agent, or Firm* — Fogg & Powers LLC

(57) ABSTRACT

A set sleep period is coordinated among a plurality of mesh network nodes to conserve power, and a temporarily reduced sleep period is coordinated among the plurality of nodes to facilitate mesh network node service or installation activity. The reduced sleep period comprises scheduling a period of time during which the sleep period is reduced, or reverting from the temporarily reduced sleep period to the original set sleep period after predetermined period of time. Temporarily reducing the sleep period includes distributing a message throughout the mesh network when the mesh network nodes are awake.

23 Claims, 2 Drawing Sheets

MESH NETWORK NODE SERVICE IN A SLEEPING MESH NETWORK

FIELD OF THE INVENTION

The invention relates generally to mesh networks, and more specifically in one embodiment to mesh network commissioning by variable sleep.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to as a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join the network.

But, joining a mesh network becomes somewhat more complex in network environments where different frequencies or network identifiers are used. In ZigBee mesh networks, for example, different frequencies or channels can be used for different networks, such as to prevent nodes from one network from interfering with another network. A new node wishing to join a network must therefore find the appropriate frequency or channel being used by the intended network before it can join the intended network. This is performed in one example by searching among the various available channels until a mesh network is found, but confirming that the node has joined the intended network is difficult.

In addition to searching various frequencies or channels, some wireless mesh network technologies also sleep, or become inactive, to conserve power. For example, an array of battery powered sensors might be configured to wake up once every two hours and take a measurement, report the measurement via the mesh network, and go back to sleep. Use of sleeping nodes typically includes allowing end devices with reduced functionality to sleep, such as between taking and reporting measurements via router nodes that do not sleep. In other embodiments sleep times are synchronized between nodes in the network during configuration, so that all nodes are awake and able to contribute to mesh network communication at the same time.

But, in environments where mesh network nodes sleep for extended periods of time, it becomes difficult to add new nodes to the network or perform certain other node or network operations. There exists a need to provide wireless mesh network technology that addresses management of a mesh network with sleeping nodes.

SUMMARY

Some example embodiments of the invention comprise a mesh network of nodes having a set sleep period coordinated among the nodes to conserve power, and a temporarily reduced sleep period is coordinated among the plurality of nodes to facilitate mesh network node service or installation activity. In further examples, the reduced sleep period comprises scheduling a period of time during which the sleep period is reduced, or reverting from the temporarily reduced sleep period to the original set sleep period after a predetermined period of time. Temporarily reducing the sleep period includes distributing a message throughout the mesh network when the mesh network nodes are awake.

DETAILED DESCRIPTION

Figure 1:
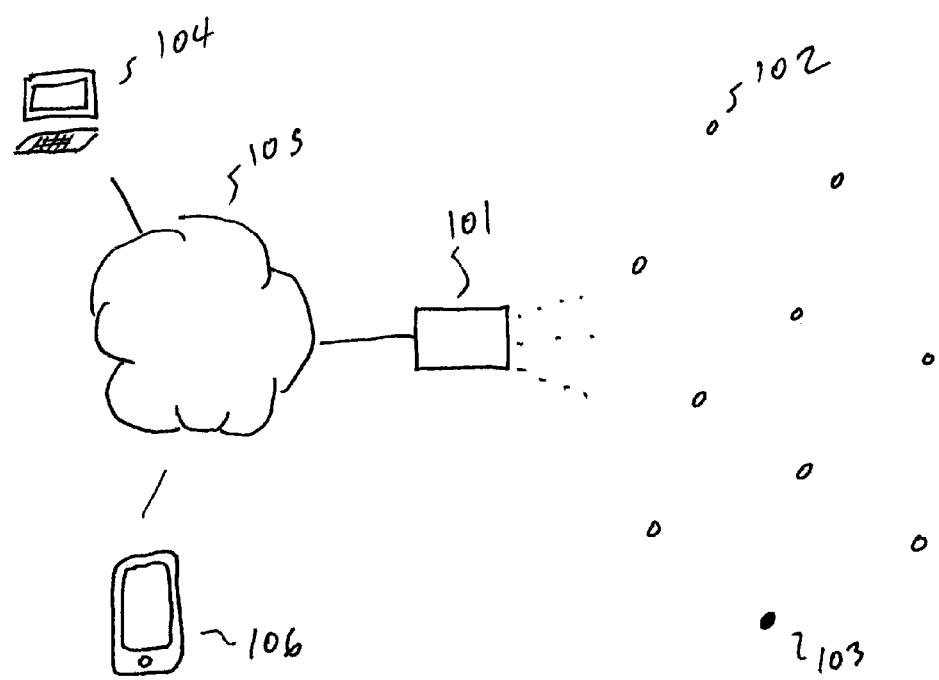
FIG. 1 shows an example wireless mesh network environment, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Mesh networks are often used to route data between various elements or nodes in a network made up of a number of loosely assembled nodes. Many mesh networks are designed such that a compatible node can easily join the network and receive and send data, including passing received data along a route to an intended destination node. Mesh networks are therefore often self-healing, in that if a node becomes inoperable or loses a connection to another node, data can be easily routed around the broken network link.

Many mesh network technologies use wireless communication, further enhancing the ease of use of mesh networking for certain applications. Because mesh network nodes are typically stationary, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network.

One example of a mesh network standard using wireless radio communication is the ZigBee mesh network, which was developed by an industry alliance and is related to IEEE standards including 802.15.4. The retail price of ZigBee-compliant transceivers is nearly a dollar, and a transceiver, memory, and processor can be bought for a few dollars in quantity, making integration of mesh network technology into inexpensive electronic devices economically practical. The standard is intended to support low power consumption at reasonably low data rates, and provides a self-organizing network technology that works well for applications such as control, monitoring, sensing, and home automation.

In this example of wireless mesh technology, one node operates as a coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

Nodes in some mesh networks can also conserve power by entering a sleep mode, or becoming inactive for extended periods of time when operation is not necessary. For example, a mesh network of ground moisture sensors may only need to take and report measurements every two hours, and need only be awake for a few milliseconds every two hour period. The sleeping nodes in a further embodiment of such a network are synchronized during configuration of the network so that they wake at the same time, enabling the nodes to communicate with each other while awake and route data from neighboring nodes.

New nodes are typically able to join an existing network by searching known radio channels on which the mesh network technology operates, and in further examples by looking for other mesh network nodes broadcasting data having a PAN ID that matches the PAN ID of the network that the new node wishes to join. But, this becomes more difficult if the other nodes in the network are asleep, and if it is unknown when or for how long the nodes will be awake. Further, the sleep timing of the network can be several hours or longer as illustrated by the previous example, which is likely longer than an installer will be willing to wait to install a new node or perform other network functions such as replacing or reconfiguring a node.

This is solved in some embodiments by leaving at least one node powered, such as the coordinator node of the mesh network. The new node can join the network and synchronize its sleep schedule from the coordinator node, and will link to neighboring nodes in the mesh once placed in the mesh during the next wake cycle. Another option is to have all nodes in the mesh network remain awake after a certain wake cycle, so that the nodes remain awake while the installer works. This requires planning the service before the preceding wake period, and requires that all nodes remain on for an extended period of time which may significantly impact battery life.

An improved approach includes sending the network a command to adjust the sleep/wake interval from a period that may not be tolerable, such as several hours, to a shorter period that is within the installer's tolerated waiting period, such as every two minutes. The reduced sleep cycle is in a further embodiment set on a temporary basis, such as for the next hour, after which time the sleep cycle reverts to its normal sleep period of several hours.

In a more detailed example, a command is sent throughout the network before a planned service event to adjust the sleep interval of the mesh network to a significantly lower time, such as from several hours to seconds or minutes. The command is sent before the planned service time, so that the change in sleep period can be distributed to all nodes in the mesh network before the installation or service is to take place. Because the nodes need typically be on for only a few milliseconds, the reduction in power from being active once every minute or two relative to leaving the network nodes powered on full time is significant.

Once the mesh network nodes have entered a reduced sleep period state, installation or service of nodes can take place without having to wait potentially hours or more between awake periods, or without having to be near a control node or other node that is constantly powered on. In a further example, a regular maintenance schedule is set, such as a half hour period occurring at the same time of day every Wednesday, during which the sleep interval is reduced to a matter of seconds or minutes. Using a regularly scheduled maintenance period removes the need to reconfigure the network for reduced sleep periods as long as maintenance or installation can be performed during the scheduled maintenance period.

FIG. 1 is a diagram of a mesh network, consistent with an example embodiment of the invention. A gateway device 101 here includes a mesh network radio, and serves as a control node for the mesh network 102 as well as a bridge between the mesh network and an external network 105. A number of mesh network nodes 102 are distributed about an area within radio contact of one another, such as security monitoring devices within a store or warehouse, water monitoring devices distributed about a golf course or farm, or military surveillance devices distributed about a hostile area. A mesh network device 103 is being newly installed, or is under maintenance.

The gateway device 101 is also linked to a computer system 104 via the Internet 105, such that the computer system is able to access the gateway 101 and configure the mesh network. In a further example, an Internet-enabled cell phone 106 is also able to access the gateway device 101 and configure or control the mesh network, enabling mesh network management from remote locations such as locations within the mesh network.

Figure 2:
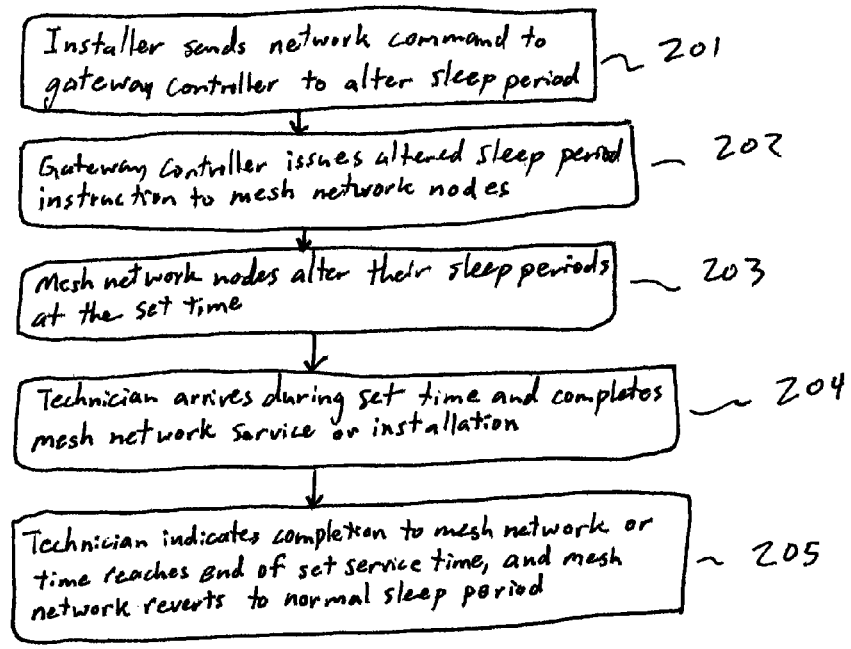
FIG. 2 is a flowchart illustrating a method of temporarily reducing sleep time in a wireless mesh network, consistent with an example embodiment of the invention.

FIG. 2 is a flowchart of a method of setting a reduced sleep period in a mesh network, consistent with an example embodiment of the invention. In this example, a network sensor has been damaged and needs to be replaced. The technician in charge of managing the network expects to be in the area to replace the failed sensor the next day between 2 pm and 4 pm.

The installer therefore sends a network command to the mesh network at 201, altering the sleep period from 2 pm to 4 pm the next day at 201. The mesh network gateway device that remains powered receives the command via a network such as the Internet to alter the mesh network sleep timing, and at 202 the mesh network nodes wake, and the altered sleep period and schedule is distributed to the mesh network nodes.

The next day at 2 pm, the mesh network nodes adjust their sleep periods from two hours to one minute for the next two hours at 203. When the technician arrives between 2 pm and 4 pm, he powers on the new mesh network sensor device and waits a maximum of one minute for the surrounding nodes to wake and communicate with the new device at 204. The technician confirms the node has joined the network, such as by observing a light or other indicator on the device, or by querying the network via an Internet-enabled cell phone. The technician then leaves the network site, and the network resumes its normal sleep period of two hours starting at 4 pm. In an alternate embodiment, the technician indicates that he is done by communicating with the gateway device via an Internet connection, and the network reverts to its normal sleep period when it next wakes as shown at 205.

Use of an adjustable sleep period to facilitate service such as in the above examples provides for significantly improved battery life of the mesh network devices, requiring in some embodiments hundreds of times less power than would be consumed if the nodes were left powered on over the same service period. The technician can also install or maintain a device in its intended location, and need not find or travel to a continually powered node or gateway device to perform node maintenance.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A method of operating a wireless mesh network, comprising:
    setting an original sleep period in a plurality of mesh network nodes to conserve power such that the plurality of mesh network nodes are synchronized in sleep and awake states, wherein during sleep states the mesh network nodes are configured not to send or receive data, wherein the plurality of mesh network nodes are further configured to send and receive data during awake states;
    in response to a received network command sent by installer via the internet, distributing by the mesh network gateway device, a maintenance schedule to one or more of the plurality of mesh network nodes during an awake state to temporarily reduce the original sleep period in the one or more of the plurality of mesh network nodes to a reduced sleep period that facilitates adding a mesh network node; and
    the mesh network nodes resuming their original sleep period after adding a mesh network node is confirmed by installer as completed.

2. The method of operating a wireless mesh network of claim 1, wherein temporarily reducing the sleep period comprises scheduling a period of time during which the sleep period is reduced.

3. The method of operating a wireless mesh network of claim 1, further comprising reverting from the temporarily reduced sleep period to the original set sleep period after predetermined period of time.

4. The method of operating a wireless mesh network of claim 1, further comprising reverting from the temporarily reduced sleep period to the original set sleep period when triggered by a technician.

5. The method of operating a wireless mesh network of claim 1, wherein the temporarily reduced sleep time is at least ten times shorter than set sleep period.

6. The method of operating a wireless mesh network of claim 1, wherein temporarily reducing the sleep period comprises distributing a message throughout the mesh network when the mesh network nodes are awake.

7. The method of operating a wireless mesh network of claim 1, further comprising:
    communicating data between a new network node and one or more of the plurality of nodes during an awake state of the reduced sleep period such that the new network node joins the mesh network; and
    wherein restoring the original sleep period comprises restoring the original sleep period once the new network node joins the mesh network.

8. A wireless mesh network, comprising:
    a plurality of wireless mesh network nodes having an original sleep period to conserve power such that the plurality of mesh network nodes are synchronized in sleep and awake states, wherein during the sleep period the mesh network nodes are configured not to send or receive data, wherein the plurality of mesh network nodes are further configured to send and receive data during awake states; and
    a mesh network gateway device configured to distribute a maintenance schedule to one or more of the plurality of wireless mesh network nodes in response to a received network command sent by installer via the internet;
    the one or more of the plurality of wireless mesh network nodes operable to temporarily reduce the sleep period to a reduced sleep period based on the distributed schedule, the reduced sleep period selected to facilitate servicing a mesh network node or installation activity, wherein the one or more of the plurality of wireless mesh network nodes are further operable to resume their original sleep period after adding a mesh network node is confirmed by installer as completed.

9. The wireless mesh network of claim 8, wherein temporarily reducing the sleep period comprises scheduling a period of time during which the sleep period is reduced.

10. The wireless mesh network of claim 8, the plurality of wireless mesh network nodes further operable to revert from the temporarily reduced sleep period to the original coordinated sleep period after predetermined period of time.

11. The wireless mesh network of claim 8, the plurality of wireless mesh network nodes further operable to revert from the temporarily reduced sleep period to the original sleep period when manually triggered by a technician.

12. The wireless mesh network of claim 8, wherein the temporarily reduced sleep time is at least ten times shorter than set sleep period.

13. The wireless mesh network of claim 8, wherein temporarily reducing the sleep period comprises distributing a message throughout the mesh network when the mesh network nodes are awake.

14. The wireless mesh network of claim 8, wherein the sleep period is coordinated among a plurality of the mesh network nodes such that the nodes are awake at the same time and operable to route data from other nodes.

15. A wireless mesh network node, said wireless network node comprising a memory storing computer executable instructions that when executed by a computerized system perform the step of:
    setting a sleep period to conserve power such that the wireless mesh network node is synchronized in sleep and awake states with a plurality of other mesh network nodes, wherein during the sleep period the wireless mesh network node is configured not to send or receive data, wherein the wireless mesh network node is further configured to send and receive data during awake states, and wherein the wireless mesh network node is further operable to temporarily reduce the coordinated sleep period to a reduced sleep period based on a maintenance schedule distributed by a mesh network gateway device during an awake state in response to a received network command sent by installer via the Internet, the reduced sleep period configured to facilitate adding a mesh network node;

wherein the wireless mesh network node is further operable to resume the original sleep period after said adding a mesh network node is confirmed by the installer as completed.

16. The wireless mesh network node of claim 15, wherein temporarily reducing the sleep period comprises scheduling a period of time during which the sleep period is reduced.

17. The wireless mesh network node of claim 15, the wireless mesh network node further operable to revert from the temporarily reduced sleep period to the original coordinated sleep period after predetermined period of time.

18. The wireless mesh network node of claim 15, the wireless mesh network node further operable to revert from the temporarily reduced sleep period to the original sleep period when manually triggered by a technician.

19. The wireless mesh network node of claim 15, wherein the temporarily reduced sleep time at least ten times shorter than set sleep period.

20. The wireless mesh network node of claim 15, wherein temporarily reducing the sleep period comprises distributing a message throughout the mesh network when the mesh network nodes are awake.

21. The wireless mesh network node of claim 15, wherein the sleep period is coordinated with one or more other mesh network nodes such that the nodes are awake at the same time and operable to route data from other nodes.

22. A non-transitory machine-readable medium with instructions stored thereon, the instructions when executed operable to cause a computerized system to:

set a sleep period in a plurality of mesh network nodes to conserve power such that the plurality of mesh network nodes are synchronized in sleep and awake states, wherein during sleep states the mesh network nodes are configured not to send or receive data, wherein the plurality of mesh network nodes are further configured to send and receive data during awake states;

temporarily reduce the sleep period in one or more of the plurality of nodes to a reduced sleep period based on a maintenance schedule distributed by a mesh network gateway device during an awake state in response to a received network command sent by installer via the internet, the reduced sleep period configured to facilitate adding a mesh network node; and the mesh network nodes resuming their original sleep period after adding a mesh network node is confirmed by installer as completed.

23. The machine-readable medium of claim 22, wherein temporarily reducing the sleep period comprises scheduling a period of time during which the sleep period is reduced.

* * * * *